Figure 3:
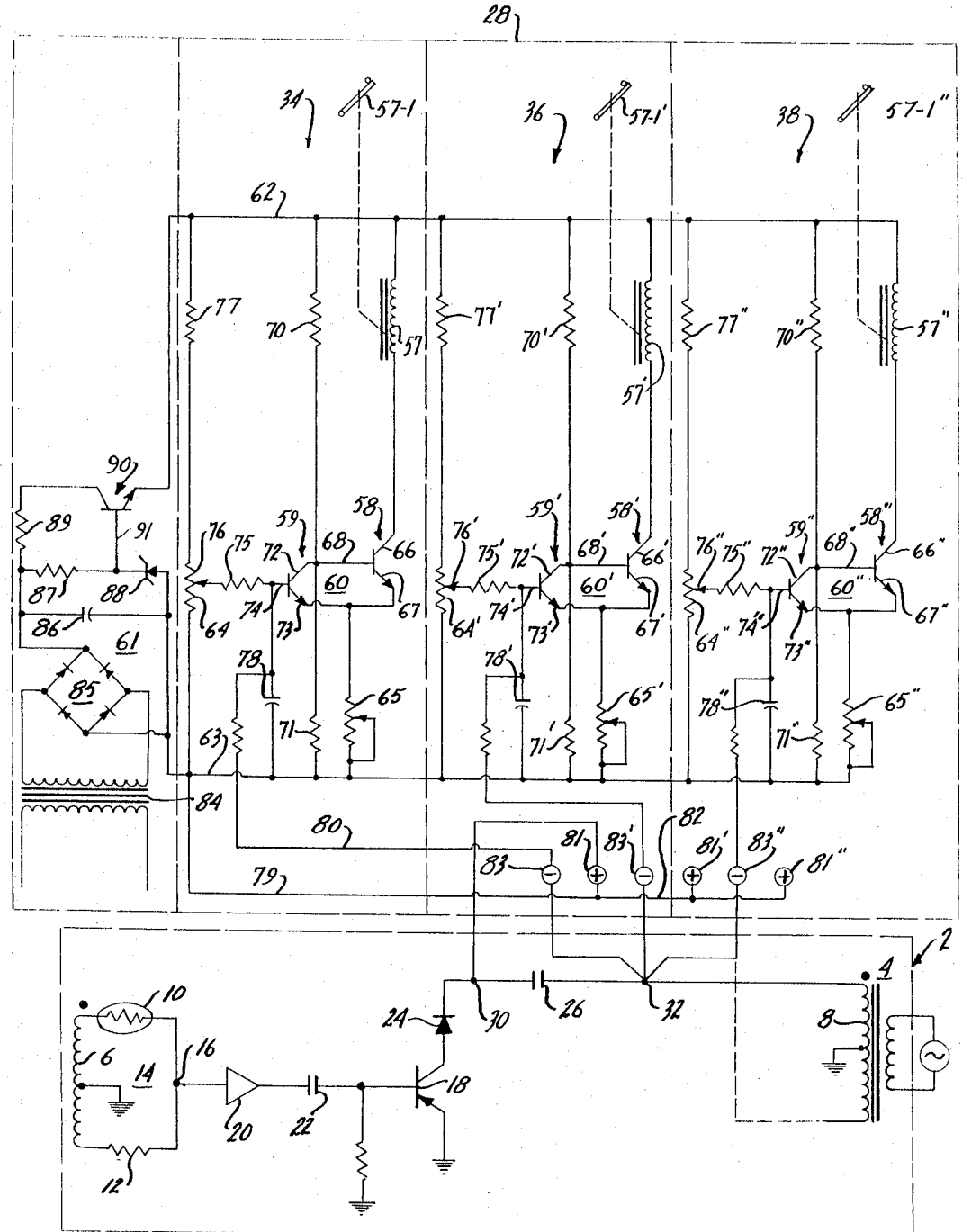

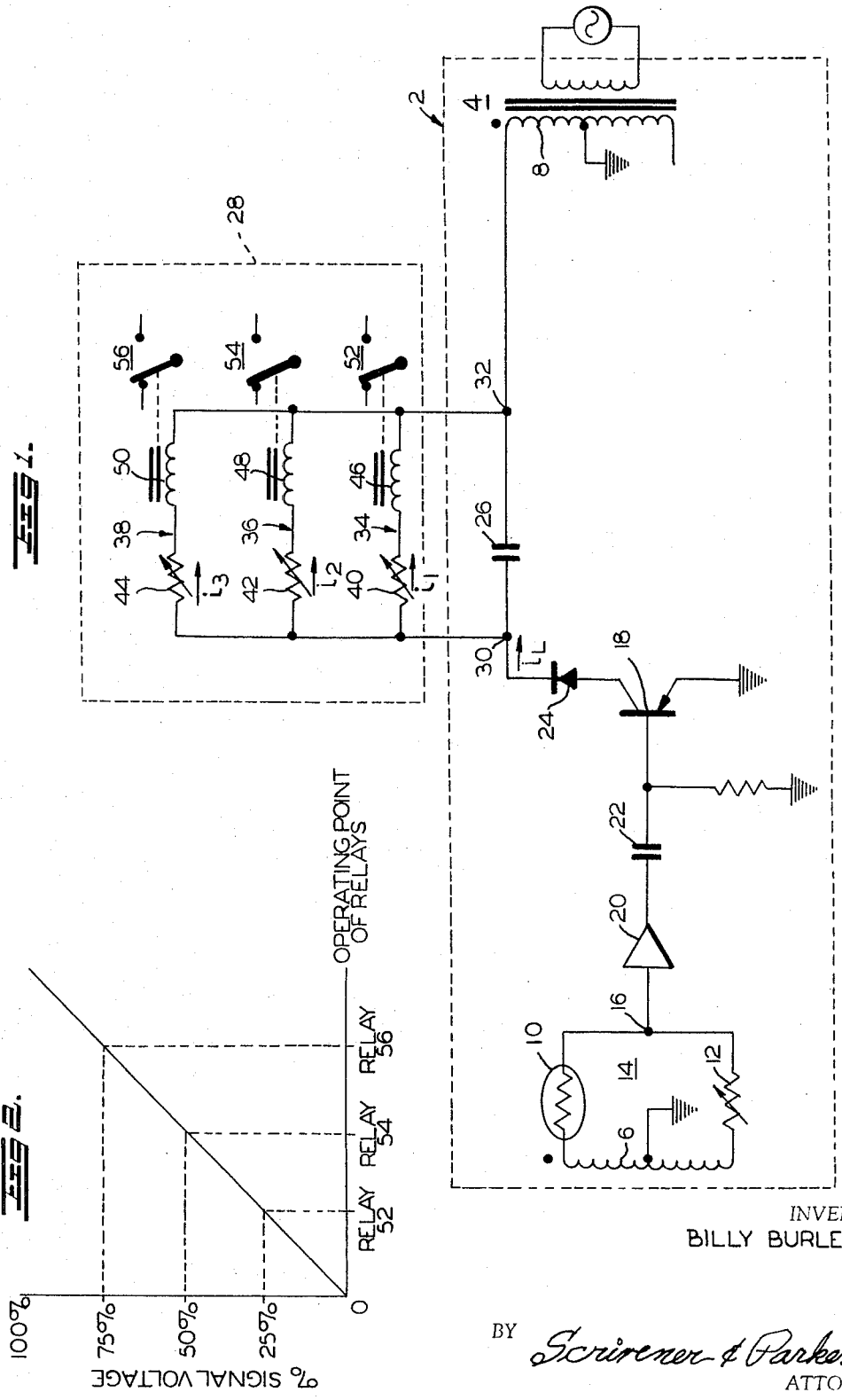

INVENTOR
BILLY BURLEY
BY
Andrus & Starke
Attorneys

United States Patent Office 3,302,070
Patented Jan. 31, 1967

3,302,070
STAGING NETWORK
Billy Burley, Dallas, Tex., assignor to Johnson Service Company, Milwaukee, Wis., a corporation of Wisconsin
Filed Oct. 22, 1965, Ser. No. 505,603
10 Claims. (Cl. 317—137)

This application is a continuation-in-part of applicant's copending application entitled Staging Network filed on June 29, 1962 with Serial No. 206,350, now abandoned. This invention relates to a staging network including a plurality of parallel current-responsive load branches at least two of which have unequal impedance values, and more particularly to a condition-responsive electronic control for successively operating a plurality of current responsive loads as a function of the magnitude of deviation of a condition from a predetermined value.

In various condition responsive electronic control systems it is often desirable to successively operate a plurality of loads in accordance with the magnitude of the deviation of a sensed condition from a predetermined value. In heating control systems, for example, it may be desired to bring higher capacity heating units into operation if the normal heating unit cannot supply enough heat to bring the controlled area back within specified limits.

One object of the present invention is to provide an electronic control system which successively operates a plurality of current responsive loads in accordance with the magnitude of deviation of a condition from a predetermined value.

A more specific object of the invention is to provide a current responsive staging network having a plurality of parallel branches possessing unequal impedances and including, respcetively, current responsive load devices.

A further object of the invention is to provide an electronic control system including condition responsive means regulating the level of current supplied to load means, said load means including a plurality of current responsive load devices connected in parallel branches of a staging network, said branches having unequal impedances. In accordance with the invention, the current responsive load devices are operated successively as a function of the magnitude of deviation of a condition from a predetermined value.

A particularly practical electrically actuated control includes a plurality of electrically actuated devices such as relays connected in separate load circuits. Each load circuit includes a Schmitt trigger circuit or similar electronic switch. The input to each trigger circuit includes an adjustable potentiometer to control the pull-in level of the associated relay. Additionally, each switch circuit includes a drop-out potentiometer in the circuit of the output transistor to control the drop-out level.

In accordance with another feature of this invention, the several load circuits are energized from a common power source including a transformer-rectifier in combination with a series regulator. The several loads are connected to a phase-responsive and condition-sensitive means, with one eside of the loads tied together to a common signal lead and the other side of the loads separately connected to the means for selective response to one polarity or the other of the two senses of deviation from a predetermined or null condition or value. The current responsive loads are operated only for deviations of a sensed condition in one sense from a predetermined value or alternatively certain loads are so actuated while other loads are operated for deviation in an opposite sense from the predetermined values.

Other objects and advantages of the invention will become apparent from a study of the following specification when considered in conjunction with the accompanying drawings.

In the drawing:
FIG. 1 is an electrical schematic diagram of the electronic control system;
FIG. 2 is a diagram illustrating one manner of successive operation of a plurality of current responsive loads shown in FIG. 1; and
FIG. 3 is a schematic diagram illustrating a preferred current responsive load circuit.

Referring to FIG. 1, the electronic control 2, which is illustrated and described in detail in the copending application of applicant entitled, "Condition-Responsive Electronic System," filed on June 29, 1962 with Serial No. 206,348 and assigned to a common assignee with the present application, includes a power transformer 4 having grounded center tapped secondary windings 6 and 8. Winding 6 is connected in series with condition responsive resistor 10; for example, a thermistor, and variable resistor 12 to define a condition responsive A.C. bridge network 14. The output junction 16 of bridge 14 is connected with the base electrode of transistor 18 via amplifier 20 and capacitor 22. The emitter electrode of transistor 18 is connected with ground, and the collector electrode is connected with one end of winding 8 via diode 24 and smoothing capacitor 26. Since transistor 18 is of the PNP type, the polarity of diode 24 is such that only the negative half cycles of the reference voltage produced by winding 8 will be applied to the collector electrode of transistor 18. With appropriate circuit modifications, transistors of the NPN type may be used in the electronic control system.

In accordance with the present invention, staging network 28 is connected with the load circuit output terminals 30 and 32 in parallel with capacitor 26. The staging network includes a plurality of parallel current responsive load branches 34, 36 and 38. The parallel branches include variable resistors 40, 42 and 44 connected in series with current responsive devices 46, 48 and 50 respectively which in the illustrated embodiment comprise the operating windings of relays 52, 54 and 56 respectively.

*Operation*

Assume that bridge 14 is temperature responsive and that variable resistor 12 is set to establish a balanced bridge condition when sensed temperature equals a predetermined value; for example, 75° F. Assume further that transistor 18 is biased to cut-off and bridge 14 is balanced, and that variable resistors 40, 42 and 44 are set to cause the impedance of branch 36 to be greater than that of branch 34 and lower than that of branch 38.

When sensed temperature equals set temperature, bridge 14 is balanced, no signal voltage appears at junction 16, transistor 18 is nonconductive, and staging network 28 is de-energized. It will be assumed that relays 52, 54 and 56 are spring biased toward their illustrated de-energized positions.

Assume now that sensed temperature varies in one sense from (for example, above) the predetermined value. A signal voltage will appear at junction 16 that has a given phase relationship relative to the reference voltage and a magnitude that is a function of the degree of condition deviation from the predetermined value. Assuming that the phase relationship between the amplified A.C. signal voltage applied to the base electrode of transistor 18 and the negative half cycles of reference voltage applied to the collector electrode via diode 24 is such that transistor 18 remains nonconductive, then staging network 28 remains de-energized and relays 52, 54 and 56 remain in the illustrated positions.

Assume, however, that the sensed temperature deviates in the opposite sense from (i.e., below) the predetermined value. The phase of the signal voltage appearing at junction 16 is reversed, and consequently transistor 18 becomes conductive during the negative half cycles of reference voltage developed by winding 8. Since the magnitude of the amplified signal voltage applied to the base electrode of transistor 18 is a function of the degree of bridge unbalance (i.e., the degree of deviation of the sensed condition from the predetermined value), the level of the effective D.C. load circuit current flowing in the emitter to collector circuit of transistor 18 is a function of the magnitude of the condition deviation. The effective load circuit current ($i_L$) equals the sum of the branch currents ($i_1$, $i_2$ and $i_3$ of staging network 28. Since the impedance of branch 36 is greater than that of branch 34, and since the impedance of branch 38 is greater than that of branch 36, $i_1$ is always greater than $i_2$ and $i_2$ is always greater than $i_3$. Assume now that relay windings 46, 48 and 50 are identical and that a given current ($i_x$) is required to trigger operation of the respective relays. By appropriate calibration of the system, the load current $i_L$ may be caused to have such a level for a temperature deviation of 1° from the predetermined value that $i_1$ equals $i_x$. Thus, if sensed temperature should equal 74°, then the load current would be such as to cause triggering of relay winding 46. Similarly, by proper calibration, load current $i_L$ may be caused to have such a level when sensed temperature equals 73° that $i_2$ equals $i_x$. Thus, when sensed temperature equals 73°, both relay windings 46 and 48 are triggered. Furthermore, by proper calibration, load current $i_L$ may have such a value when sensed temperature equals 72° that all three relay windings are triggered.

If sensed temperature should now increase to 73°, $i_3$ falls below triggering level $i_x$. Since the relays are spring biased toward the illustrated position, when the level of current flowing through winding 50 falls below the triggering level, relay 56 is returned to the illustrated position. When sensed temperature equals 74°, $i_2$ falls below $i_x$ and relay 54 is returned to the illustrated position. Finally, when sensed temperature equals 75°, the electronic control is deactivated and relay 52 is returned to the illustrated position. FIG. 2 is illustrative of relay operation as a function of signal voltage magnitude.

Thus, it is apparent that for temperatures equal to or above set temperature, the electronic control is deactivated. For temperatures below set temperature, the respective loads are successively energized (or de-energized) in accordance with the magnitudes of the temperature deviations. The sense of response of the electronic control to condition deviations may be reversed in accordance with the teachings presented in applicant's copending application entitled "Electronic System Affording Reversible Modulating Control," which was filed on June 29, 1962 with Serial No. 206,343 and assigned to a common assignee as the present application.

Referring particularly to FIG. 3, a detailed schematic diagram of a preferred load circuit to replace the simplified illustration in FIG. 1 is shown. The three load branches are shown in a novel construction including means to control the pull-in and drop-out voltages for individual control relays. The electronic control 2 of FIGS. 1 and 3 correspond and are similarly numbered for purposes of simplicity and clarity of explanation. Additionally, each of the load circuits or branches shown in FIG. 3 is identical to the other two and consequently the first branch 34 is described in detail with the corresponding elements in the other branches identified by corresponding primed and double primed numbers.

Referring particularly to the first branch, the output is shown as a relay 57 controlling a set of contacts 57–1. The relay is connected for energization through an output transistor 58 and an input transistor 59 interconnected to form a known Schmitt trigger circuit 60. The Schmitt trigger circuit 60 and the relay 57 are connected for energization to a regulated power supply 61 providing a direct current output between a positive line 62 and a negative line 63. As more fully described hereinafter, a pull-in control potentiometer 64 is interconnected in the input circuit of the transistor 59 and a drop-out potentiometer 65 is connected in the common emitter circuit of the transistors 58 and 59.

Before describing the circuit in detail, its operation is briefly described as follows.

The transistor 59 is normally conducting and maintains the transistor 58 turned off or in a quiescent state. Consequently, the relay 57 is de-energized. The control 2 is connected to provide a bias tending to turn off transistor 59 if the temperature deviates in a given direction or sense from a null or predetermined value. If the input signal from the condition responsive amplifier circuit is of the appropriate magnitude and polarity, the transistor 59 is cut off. Due to regenerative action, the transistor 58 will rapidly turn on to provide energization of the relay 57. The necessary condition responsive input signal output to operate the first load is determined by the potentiometer 64 which provides a convenient and reliable continuous adjustment means of such pull-in voltage. Inversely, the drop out voltage; i.e. the voltage at which the transistor 58 will turn off and the transistor 59 will turn on, is determined by the setting of the drop-out potentiometer 65. Consequently, the circuit of FIG. 3 not only provides for sequential operation of the several loads in accordance with the input signal but further provides a means to separately control the pull-in and the drop-out voltages of the several load circuits.

More particularly, in the illustrated embodiment of the invention, the output transistor 58 is illustrated as an NPN transistor having its collector 66 connected in series with the relay 57 to the positive line 62. The emitter 67 of the transistor 58 is connected in series with the potentiometer 65 to the negative line 63. The base 68 of transistor 58 is connected to the junction 69 of a pair of voltage dividing bias resistors 70 and 71 connected between the lines 62 and 63. The junction 69 is also connected to the collector 72 of the transistor 59. The emitter 73 of the transistor 59 is connected to the positive or top of the potentiometer 65 and thereby to line 63. The input base of the transistor 59 is connected in series with a base resistor 75 to a tap 76 of the pull-in control potentiometer 64. The potentiometer 64 is connected in series with a resistor 77 between the positive line 62 and the negative line 63. A capacitor 78 is connected directly between the base 74 and the negative line 63 in accordance with known circuit connections.

Input signal leads 79 and 80 are connected respectively to the negative line 63 and the positive side of the capacitor 78. The negative signal lead 79 of each of the several load circuits is connected to corresponding positive input terminals 81 and, in illustrated embodiment of the invention, the several terminals are interconnected by a common lead 82 and by a single lead to the positive terminal 30 of control 2. In actual practice, the circuit can be formed as a printed circuit with a printed connecting line positively interconnecting the positive input terminals 81. The negative input terminals 83 are separately provided and individually and separately connected to the corresponding loads and to the input or the negative terminal 32 of the control 2 to reverse bias the input to the transistor 59 to cut off the transistor 59 and allow transistor 58 to operate, as hereinafter described.

The several branches are energized from the common power supply 61 which is illustrated as including a transformer 84 connected to energize a full wave diode bridge rectifier 85. A regulating circuit interconnects the output of the rectifier 85 to the positive lines 62 and 63. The illustrated regulating circuit includes a capacitor 86 connected directly across the output leads or terminals of the bridge 85. A resistor 87 in series with a Zener type diode 88 is connected directly across the output leads in parallel with the capacitor 86. Additionally, a resistor 89 is connected in series with the collector-emitter output circuit of an NPN transistor 90 between the positive lead of the bridge 85 and the positive line 62. The base 91 of the transistor 90 is connected to the junction of the resistor 87 and the diode 88. The power supply provides a regulated direct current voltage as a result of the action of the transistor 90, the diode 88 and the resistors 87 and 89 to provide a common output to all stages or branches of the staging network.

In accordance with the usual Schmitt trigger operation, potentiometer 64 is set to apply a normal turn-on bias to the base 74 of the transistor 59. Consequently, in the absence of any applied signal, the transistor 59 is conducting. This provides a turn-off signal across the base 68 to emitter 67 of the transistor 58 and holds it in a quiescent or off state. When an input signal of an appropriate polarity is applied to the transistor 59 and particularly across the leads 79 and 80, the transistor 59 is reverse biased by the amplified signal to a level overcoming the standby bias applied through the voltage dividing network of resistor 77 and potentiometer 64 and transistor 59 is turned off. When the transistor 59 is turned off, the bias circuit provided by resistors 70 and 71 will rapidly bias transistor 58 to conduct and the second quiescent or stable state is established wherein transistor 59 is turned off and transistor 58 is turned on.

The relays of FIG. 3 can be operated generally in the manner shown and described for the circuit of FIG. 1. The circuit would then be established to provide a null output at 75° F. with bridge 14 balanced and the transistor 18 cut off. The several pull-in potentiometers 64, 64' and 64" are preset to sequentially energize the loads, relays 57, 57' and 57". The potentiometer 64 would be set to apply the smallest positive on voltage to the base 74 with the potentiometer 64' establishing a greater positive voltage and 64" applies still a greater positive voltage to the bases 74' and 74" of the input transistors 59' and 59" such that the opposing voltage established by the condition responsive signal must be successively larger in order to actuate the various stages.

If the temperature varies in a manner to apply a signal voltage to the transistor 18, such that the amplified A.C. signal voltage in the negative half cycle of the reference voltage applied to the collector electrode via the diode 24 is such that the transistors 59 remain conducting, the load relay will of course remain de-energized. However, if the phase or the sensed temperature deviates in the opposite sense, the phase of the signal voltage at the junction 16 is reversed and biases the transistor 18 on during the negative half cycle of the reference voltage developed by the winding 8 and consequently will turn on the transistor 18. The turn-on bias is directly proportional to the degree of the deviation of the sensed condition from the predetermined value and consequently the level of the effective D.C. load current flowing in the emitter to collector circuit of the transistor 18 is a direct function of the magnitude of the condition deviation. This current is simultaneously applied to each of the staging networks or branches 34, 36 and 38 and the effective load circuit current equals the sum of the several currents, as in the embodiment of FIG. 1. As a result of the setting of the potentiometers 64, 64' and 64" at a given deviation, the current supplied to the branch 34 and particularly to the input of transistor 59 is sufficient to establish an opposing voltage to that generated by the input bias circuit of resistor 77 and potentiometer 64 to reverse bias the input circuit of the transistor 59 and consequently the Schmitt trigger 59 will turnoff. As a result of the Schmitt trigger circuit, the transistor 58 rapidly moves into conduction and remains in the conducting state to energize the associated relay 57 during the period that the amplified signal is at that level or greater.

Further, even when the temperature reverses and drops below the set value, whether or not the transistor 58 drops out depends upon the setting of the potentiometer 65 connected in the emitter circuits of both transistors. When the transistor 58 conducts the current passes through the common emitter resistor 65 and provides a back bias voltage on the emitter of the transistor 58; holding the emitter 73 at a selected positive voltage with respect to the negative line 63. This voltage not only maintains the transistor cut off but determines the required positive voltage at the base 74 to turn the transistor 59 back on to reverse the state of the Schmitt trigger circuit.

The potentiometers 64 and 65 provide a convenient means for controlling the pull-in and drop-out voltage of the individual relay 57 or other similar current responsive load.

Returning to the example, if the deviation of the temperature continues in the same direction, the output of the circuit of transistor 18 increases the load current supplied to the several branches. At a level determined by potentiometer 64', the load current overcomes the bias from the supply 61 on the transistor 59' and switches the transistor 59' into a non-conducting state. The regenerative action of the Schmitt trigger circuit rapidly turns on the transistor 58' to energize the relay 57'.

If the temperature still continues to increase, the third stage or branch energizes relay 57" in a similar manner.

Consequently, as in FIG. 1, at temperatures above the set temperature, the electronic control 2 is effectively de-activated whereas for temperatures below set temperatures, the respective loads are sequentially actuated in accordance with the magnitudes of the temperature deviation.

Conversely, as the temperature decreases from the abnormal levels, the stages can be actuated to drop out in the same or in some other sequence if so desired merely by proper adjustment of the potentiometers 65, 65' and 65".

The respective circuits will react slowly to changes in the input signal voltage. This has the desirable feature of making the unit substantially insensitive to ripple voltage in the control circuit. It also introduces a slight time lag in the operation of the relays to de-energization after the input voltage drops below the particular drop-out point. However, the delay is not such as to cause any adverse overall action in the control of a temperature system or the like.

Further, in both the embodiments of FIGS. 1 and 3, and more clearly as shown in the embodiment of FIG. 3, one or more of the stages can be readily connected to operate on the other side of null. Referring particularly to FIG. 3, the positive terminals 81 are permanently interconnected together and remain connected to the positive terminal of the amplifier circuit and particularly to the output side of the diode 24. However, the negative terminals 83, 83' and 83" for the several stages 34, 36 and 38 may be connected to either side of the load transformer 8. If a relay is to be operated on the opposite side of null, the corresponding negative terminal 83, 83' or 83" is connected to the opposite end of the transformer 4 to provide the desired reverse action. For example, if load branch 34 is connected as shown by the phantom alternate connecting negative lead during the opposite half cycle, when the grounded center tap of the transformer 4 for winding 8 is positive with respect to the lower end of the winding, the current path is from ground to the emitter of the transistor 18 and through the transistor 18 and the diode 24, the reverse load branch 34. In the illustrated embodiment of FIG. 3, the load current is through the bias circuit of transistor 59 to the negative terminal or lower end of the transformer winding 8 in the present discussion. This current cannot pass through the other branches during the cycle due to the relative positive polarity of the top end of winding 8 and the blocking diode 24. Thus, the device provides a very simple and flexible means for providing the desired control action with the continued sequential operation of the loads at any desired pull-in and drop-out voltage and to either side of a null or balanced condition. It thus provides a particularly practical and versatile control circuit in combination with the illustrated electronic control.

The circuit of FIG. 3 has been commercially developed as a three stage network for temperature and refrigerating control systems. A typical example of the many different possible systems is the sequential starting and stopping of motors to control a heating and refrigeration system.

In summary, the preferred construction as shown in FIG. 3 provides for a plurality of relays or the like with positive relay action having the relay pull-in and drop-out differential independently adjustable for each stage. The staging network offers convenient both sides of null operation for the individual stages as well as the use of separate controllers for the separate stages. The controller or the staging network can be constructed in a simple compact unit having its own housing or mounted separately as a part of an overall control housing. Due to its flexibility, the present invention is particularly adapted to temperature and other atmospheric condition controls where various installations require different combinations of the controller.

The staging network of the present invention is not to be construed as being limited to use with the specific electronic control system disclosed in the foregoing specification.

The condition responsive bridge may be of the variable resistance, inductance, capacitance or impedance type responsive to changes in conditions such as temperature, pressure, humidity and the like. However, other phase responsive devices (for example, differential transformer means) could also be used. Various modifications and changes may be made in the apparatus described without deviating from the invention set forth in the following claims.

Various modes of carrying out the invention are contemplated as being within the scope of the following claims particularly pointing out and distinctly claiming the subject matter which is regarded as the invention.

I claim:

1. A condition responsive control system for successively operating a plurality of current responsive loads in accordance with the deviation of a condition solely in one sense from a predetermined value, comprising
    a source of alternating current voltage,
    a unidirectionally conductive device,
    current controlling means including a pair of power circuit electrodes and a control electrode, said control electrode controlling the amplitude of the current flow through said power circuit electrodes,
    a staging network including a pair of terminals between which are connected a plurality of paralleled branches each including a current responsive load and an adjustable resistance element to adjust the energization of the load, each of said current responsive loads being operable only when the current flowing therethrough exceeds a predetermined value, the independent adjustment of the corresponding resistance element, setting the amplitude of the current flow through said current controlling means to establish the necessary current flow through the current controlling means to operate the corresponding load,
    load circuit means connecting in series said voltage source, said unidirectionally conductive device, said network terminals, and the power circuit electrodes of said current controlling means whereby said current controlling means is biased to conduct during one half cycle of the voltage source,
    condition responsive alternating current bridge network means connected with said control electrode, said bridge network means including an energizing winding, and
    means energizing said energizing winding with an alternating current voltage having the same frequency as, and a given phase relationship relative to, said voltage source to bias the current controlling means to conduct in response to the deviation of the condition in said one sense.

2. Apparatus as defined in claim 1 wherein said adjustable resistance elements are connected in series with the corresponding current responsive loads.

3. Apparatus as defined in claim 1 wherein at least one of said loads comprises a current responsive relay having a winding series connected with the corresponding resistance element in said parallel branch, and further including a capacitor connected in parallel with the terminals of said staging network.

4. Apparatus as defined in claim 1 wherein each of the paralleled branches include,
    a power supply means,
    an electronic switching means connected in an energizing circuit with said current responsive load and said power supply means, said switching means having a first state and a second state for controlling the energized state of the current responsive load,
    an input bias circuit for the switching means and providing a normal input bias establishing said first state and including said adjustable resistance element to control the level of the input bias, and
    means to connect the load circuit means to the input bias circuit and at a selected level change the switching means to said second state.

5. The apparatus of claim 4 wherein
    said power supply means is a regulated power supply connected to energize said branches,
    each of said branches including a voltage dividing means having the resistance element serially connected therein, said resistance elements being connected by an adjustable tap to the switching means to establish said normal input bias, and
    said load circuit means being connected to establish an opposing voltage across the circuit of the resistance element and the switching means to establish the second state.

6. Apparatus as defined in claim 1 wherein
    the staging network includes an input lead common to all of said paralleled branches and a plurality of of directional control leads, one for each of said branches, and
    said load circuit means includes a center tapped winding having the center tap connected to one of the power circuit electrodes and the opposite ends of the winding connected selectively to the directional signal leads to energize each load in accordance with the deviation of a condition solely in one sense from a predetermined value with the sense preselected by the connection of the corresponding directional signal lead.

7. Apparatus as defined in claim 1 wherein each of the paralleled branches includes,
    a power supply means,
    an input transistor and an output transistor interconnected with the power supply means to form a Schmitt trigger circuit, the load being connected in circuit with the output transistor and the power supply means, said adjustable resistance element being connected in an input circuit of the input transistor to establish a selected adjustable bias and having a pair of input control terminals.

8. Apparatus as defined in claim 1 having
    a regulated power supply connected to energize the paralleled branches, each of said paralleled branches having an input transistor and an output transistor interconnected to form a Schmitt trigger circuit, the load being connected in circuit with the output transistor to the regulated power supply, said adjustable resistance element being connected in an input circuit of the input transistor to establish a selected adjustable bias and having a pair of input control terminals, a signal lead forming one of the network terminals and connected from a unidirectionally conductive device and to one corresponding input terminal of each branch, and directional signal leads connected to the other input terminal of each branch and forming individual and separate second network terminals connected to said source.

9. The apparatus of claim 8 wherein the input circuit of the respective branches includes a resistive voltage dividing network serially including the adjustable resistance element, said element having a tap connected to the corresponding input transistor, and the signal leads are connected to oppose the bias of the voltage dividing network.

10. Apparatus as defined in claim 8 wherein said load circuit means includes a center tapped winding having the center tap connected to one of the power circuit electrodes and the opposite ends of the winding connected selectively to the directional signal leads to energize each load in accordance with the deviation of a condition solely in one sense from a predetermined value with the sense preseleted by the connection of the corresponding directional signal lead.

References Cited by the Examiner
UNITED STATES PATENTS

| | | | |
|---|---|---|---|
| 2,632,144 | 3/1953 | Borell | 317—153 X |
| 2,637,165 | 5/1953 | Stockinger | 317—137 |
| 2,828,464 | 3/1958 | Nixon et al. | 317—153 |

MILTON O. HIRSHFIELD, *Primary Examiner.*

L. T. HIX, *Assistant Examiner.*